(12) United States Patent
Sako et al.

(10) Patent No.: US 7,231,601 B2
(45) Date of Patent: Jun. 12, 2007

(54) APPLICATION SYSTEM WITH FUNCTION FOR PREVENTING MODIFICATION

(75) Inventors: Hiroshi Sako, Shiki (JP); Naohiro Furukawa, Hachioji (JP); Hisashi Ikeda, Kunitachi (JP); Yosuke Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 10/770,495

(22) Filed: Feb. 4, 2004

(65) Prior Publication Data

US 2005/0120295 A1 Jun. 2, 2005

(30) Foreign Application Priority Data

Nov. 28, 2003 (JP) ............................. 2003-398396

(51) Int. Cl.
  *G06F 15/00* (2006.01)
  *G06K 9/00* (2006.01)
(52) U.S. Cl. ...................... 715/541; 382/188
(58) Field of Classification Search ............... 715/507, 715/508, 541, 512; 345/179; 382/188
  See application file for complete search history.

(56) References Cited

U.S. PATENT DOCUMENTS

| | | | | |
|---|---|---|---|---|
| 5,897,648 A | * | 4/1999 | Henderson | 715/530 |
| 6,031,936 A | * | 2/2000 | Nakamura | 382/187 |
| 6,062,673 A | * | 5/2000 | Omo et al. | 347/40 |
| 6,422,775 B1 | * | 7/2002 | Bramlett et al. | 401/195 |
| 6,689,966 B2 | * | 2/2004 | Wiebe | 178/18.01 |
| 6,737,591 B1 | * | 5/2004 | Lapstun et al. | 178/19.05 |
| 6,836,555 B2 | * | 12/2004 | Ericson et al. | 382/116 |
| 6,931,153 B2 | * | 8/2005 | Nakao et al. | 382/188 |
| 2002/0065853 A1 | * | 5/2002 | Takahashi et al. | 707/527 |
| 2002/0126105 A1 | | 9/2002 | O'Donnell, Jr. | |
| 2003/0229859 A1 | * | 12/2003 | Shiraishi et al. | 715/541 |

(Continued)

FOREIGN PATENT DOCUMENTS

| | | |
|---|---|---|
| EP | 1 365 314 A2 | 5/2003 |
| JP | 2003335082 | 11/2003 |
| WO | WO 01/48590 A1 | 12/2000 |

OTHER PUBLICATIONS

McGee et al., Comparing Paper and Tangible, Multimodal Tools, ACM 2002, pp. 407-414.*
Guimbretiere, Paper Augmented Digital Documents, ACM 2003, pp. 51-60.*
Austrian Patent Office Search Report dated Jun. 18, 2004.

*Primary Examiner*—Cong-Lac Huynh
(74) *Attorney, Agent, or Firm*—Reed Smith LLP; Stanley P. Fisher, Esq.; Juan Carlos A. Marquez, Esq.

(57) ABSTRACT

A digital pen-based application form filling system with a modification prevention function, which eliminates a possibility that digital information initially written in digital paper using a digital pen may be modified deliberately or accidentally. The system prints a new fine pattern over areas in already written digital paper whose contents one wishes to protect against being modified. This printing adds a fine pattern to an original dot pattern already present on the digital paper to make it theoretically impossible to enter information into these areas using the digital pen.

20 Claims, 8 Drawing Sheets

U.S. PATENT DOCUMENTS

| | | | |
|---|---|---|---|
| 2004/0085301 A1* | 5/2004 | Furukawa et al. | 345/179 |
| 2004/0160430 A1* | 8/2004 | Tokunaga et al. | 345/179 |
| 2004/0190391 A1* | 9/2004 | Kinjo | 369/30.03 |
| 2005/0034072 A1* | 2/2005 | Sherr | 715/534 |
| 2005/0088419 A1* | 4/2005 | Lapstun et al. | 345/173 |
| 2005/0114773 A1* | 5/2005 | Thacker | 715/541 |
| 2005/0120295 A1* | 6/2005 | Furukawa et al. | 345/179 |
| 2005/0141060 A1* | 6/2005 | Rydbeck et al. | 358/512 |
| 2005/0243369 A1* | 11/2005 | Goldstein et al. | 358/1.18 |
| 2006/0018546 A1* | 1/2006 | Lagardere et al. | 382/186 |
| 2006/0022963 A1* | 2/2006 | Bosch et al. | 345/179 |
| 2006/0075340 A1* | 4/2006 | Coffy | 715/541 |
| 2006/0082557 A1* | 4/2006 | Ericson et al. | 345/179 |

\* cited by examiner

APPLICATION SYSTEM WITH FUNCTION FOR PREVENTING MODIFICATION

BACKGROUND OF THE INVENTION

The present invention relates to an application form filling system using a digital pen with a content modification prevention function.

In recent years, a growing number of governments, municipal offices and corporations are transforming written applications and circulars into digital documents to facilitate document management and inquiries. One example of a technology for real-time transforming of information handwritten on an application form into digital data is WO01/48590A1 that describes a digital pen and digital paper.

The digital paper is paper having its surface formed with a special printed dot pattern and printed with a particular document format (FIG. 8). The paper surface is sectioned with virtual lattices of a predetermined size and is assigned a part of a dot pattern formed over a vast area, with dots 82 that are allocated to intersections 81 between virtual lattice lines, and shifted uniquely by a predetermined distance from their associated intersections so that any position on the paper can be identified and located uniquely. A plurality of these dots, for example 6×6 dots, are checked and a unique combination of up, down, left and right deviation values for these 36 dots provides information on an absolute position in the vast planar area. The digital pen comprises a pen that fixes ink on paper to make written characters visible, a camera for reading a dot pattern on the paper surface, a pressure sensor for detecting a writing pressure acting on the pen, an image processor that processes data obtained from the camera and the pressure sensor to generate position information made up of coordinate data on loci of characters-strokes, a memory for temporary storage of the position information, and a wireless transmission device for sending the position information to other devices.

When a user (user) fills in necessary fields in an application from of digital paper using a digital pen, position information is detected based on the dot pattern read by the camera in real time and the pressure sensor detects writing pressure. The position information is stored in memory and transmitted from the wireless transmission device after the completion of form filling. The data received is processed by an analyzer that relates the position information to a document format. Then, after undergoing a character recognition process as necessary, the data becomes an electronic document. Then, in general tasks a plurality of persons in charge successively adds information to the digital paper, such as examiner's sign, approval signature and comments, in a procedure similar to the above by using the digital pen.

SUMMARY OF THE INVENTION

A system that permits addition and correction of information, however, has a problem that initial information written in the digital paper could be changed with ill intention or accidentally by the use of the digital pen. A system may be conceived that uses additional information on an authorized writer and digital pen ID information for each field to prevent modification of information. This software countermeasure, however, may not be effective in coping with an ill-intentioned hacker or impersonation.

To solve the problem described above, in the application form filling system using a digital pen and digital paper has a means for printing a new fine pattern in those areas on the digital paper the contents of which one wishes to protect against modification is prepared. Information on areas whose contents one wishes to protect against modification, such as area positions and sizes, is defined for each application in an application format file. Based on the defined information, a printing device is used to print the modification prevention fine pattern on these areas. As a result, the new fine pattern is added to the original dot pattern already present on the digital paper.

With the fine pattern added as described above, the original dot pattern is rendered unreadable with the camera in the digital pen. So, the position information of the pen point cannot be detected and an input error results, making it theoretically impossible to convert the pen-written content into digital data. This in turn prevents a possible modification of the initially written information. If, an input error occurs after the fine pattern for the modification prevention has been printed, there is a possibility that an attempt to add or modify the written content may have been made. Therefore, the time when the input error took place may be stored. Further, the additional fine pattern may be given an easily distinguishable color to facilitate user's visual recognition of the anti-modification areas.

Other objects, features and advantages of the invention will become apparent from the following description of the embodiments of the invention taken in conjunction with the accompanying drawings.

DETAILED DESCRIPTION OF THE EMBODIMENTS

The present invention prints a modification prevention fine pattern on the digital paper to realize an object of forcibly forming a physical area on the digital paper to which information cannot be added or the content of which cannot be changed by means of the digital pen.

Figure 1:
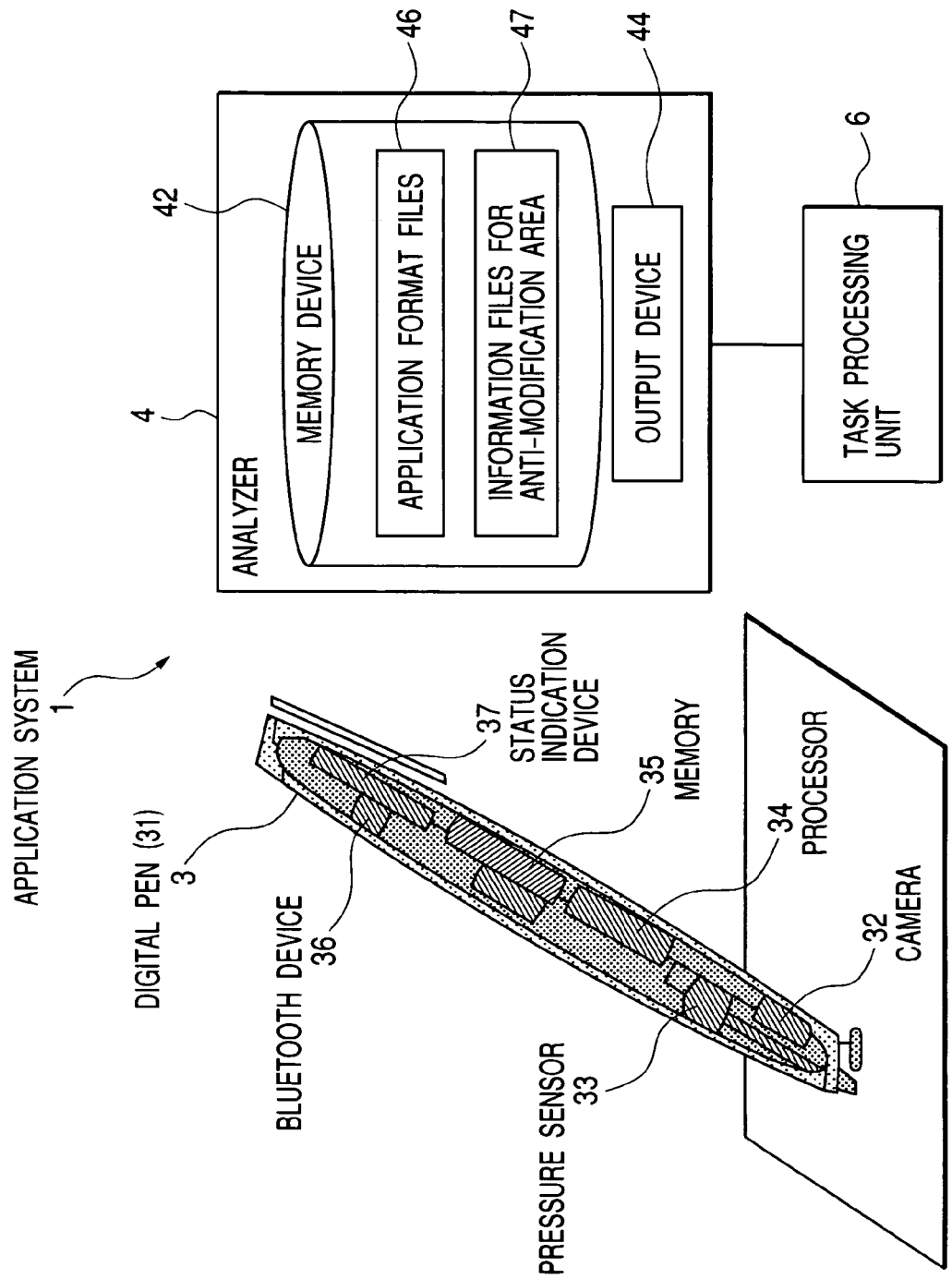
FIG. 1 shows an overall configuration of a digital pen-based application form filling system with a modification prevention function as one embodiment of the present invention.
Figure 2:
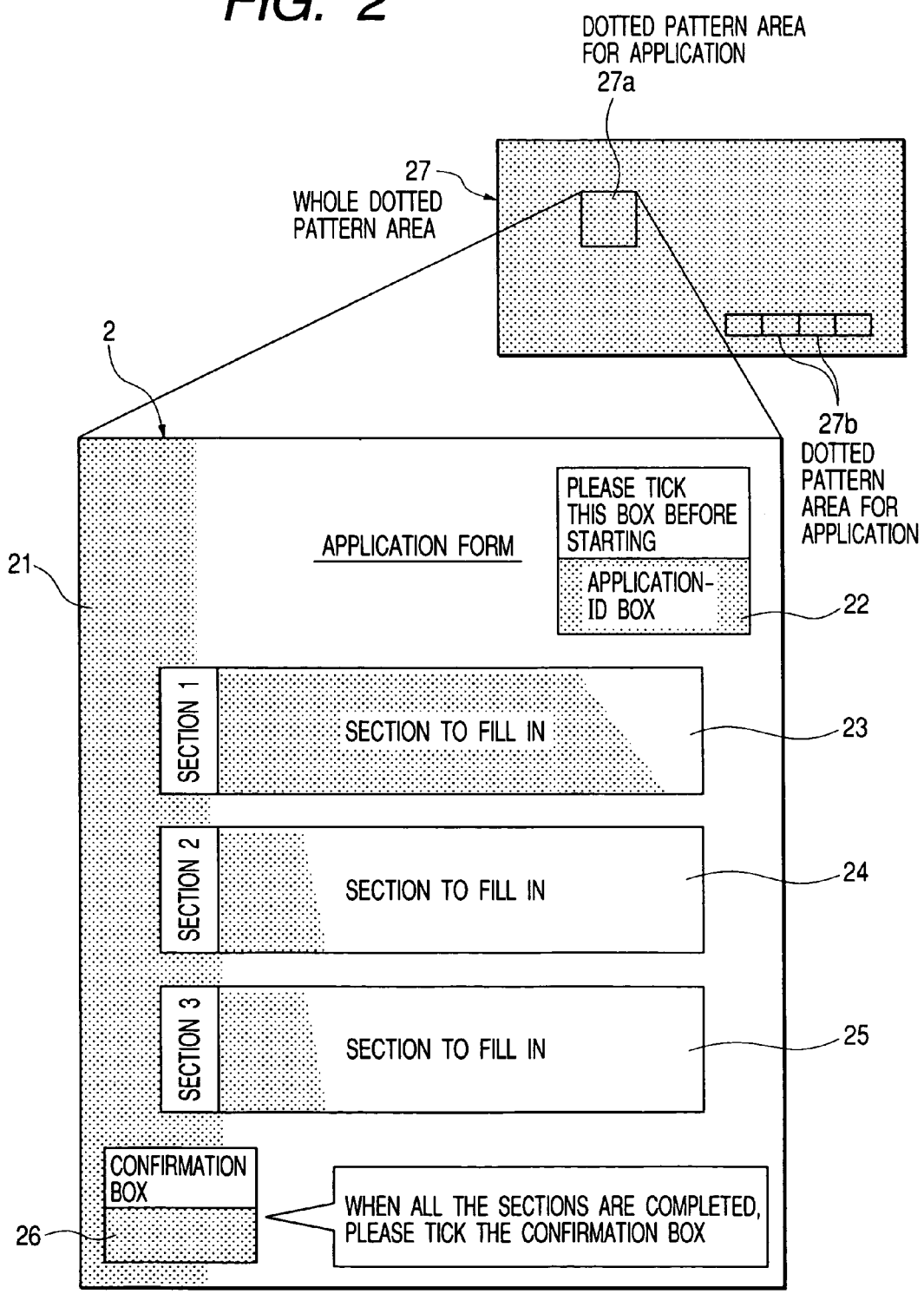
FIG. 2 illustrates an example configuration of an application form.

Embodiments of this invention will be described in detail by referring to the accompanying drawings. FIG. 1 illustrates an overall configuration of an application form filling system using a digital pen. FIG. 2 shows an example configuration of a document used in the application form filling system.

As shown in FIG. 1, the application form filling system (application system) 1 includes an application form 2 that functions as digital paper printed with a unique dot pattern, a digital pen 3 for writing necessary information into the application form 2, an analyzer 4 for analyzing position information generated by the digital pen 3, a memory device 42 storing an application format file 46 necessary for analysis and an anti-modification area information file 47 according to this invention, defining position information on those areas the contents of which one wishes to protect against addition and substitution of information, an output device 44 for printing an additional fine pattern based on the positional information about the areas whose contents one wishes to protect against modifications, and a task processor 6 for performing a task based on the result of analysis. The analyzer 4 and the task processor 6 may be provided in the same computer terminal or in two different computer terminals. When they are separately provided in two different computer terminals, they are arranged to enable the exchange of data through a communication network such as Internet and LAN (Local Area Network).

In the example shown in FIG. 2, the application form 2 has on its surface a dot pattern 21 (only a part of which is shown), a first section 23, a second section 24 and a third section 25 in which necessary information is to be entered, and a confirmation box 26, a check box for permitting the position information on the locus of a pen point stored in the digital pen 3 to be transmitted. Generally, different pages or sheets of the same application form can be automatically identified by forming unique patterns on the different pages. In an application form 2 having the same dot pattern on all pages, an application ID box 22 may be provided for identifying individual sheets. The dot pattern 21 printed on this application form 2 is a part 27a of a whole dot pattern 27 in which a huge amount of dots are arranged. When the application ID box 22 is provided, the application ID box 22 of different sheets of the application form 2 are assigned different dot patterns in areas 27b. The areas 27b are specially defined areas in the system to distinguish individual sheets of the application form.

The digital pen 3, whose configuration is shown in FIG. 1, comprises a pen 31 as a writing tool for writing necessary items in the application form 2, a camera 32 for reading a dot pattern printed on the application form 2, a pressure sensor 33 for detecting a writing pressure acting on the pen 31 when writing, a processor 34 for processing data from the camera 32 and the pressure sensor 33 to generate position information made up of coordinate data of the loci of characters and others, a memory 35 for temporarily storing the position information, a wireless transmission device (Bluetooth device) 36 for sending the position information to another device, and a status indication device 37 for feeding back to the user a result of check (detailed later) performed when writing information. One example of the wireless transmission device 36 is a device that sends and receives data by using a predetermined radio frequency band according to a communication protocol of Bluetooth (trademark of Bluetooth SIG Inc.), a standard for a short range wireless communication technology. The transmission device may also include devices of other wireless technologies, wireless LANs and other devices that transmits and receives data according to a communication protocol of wired communication technology, such as USB. The processor 34 stores pen IDs, unique identification information assigned to each digital pen 3.

The status indication device 37 is a vibrating device which, in the event of an input error while writing on the application form 2, vibrates the digital pen 3 to alert the user to the input error through the sense of touch. The status indication device 37 may also be a light emitting device or a sound source to notify the user of a decision result by turning on or blinking light or making sound. With this status indication device 37 the digital pen 3 of this embodiment enables the user to take a swift, appropriate action upon occurrence of an input error.

The processor 34 has a CPU (Central Processing Unit), a ROM (Read Only Memory) and electric/electronic circuits. Among the functions of the processor 34 are management and transmission of the position information and operation of the status indication device 37. The management of the position information involves receiving information from the pressure sensor 33 and the camera 32, generating position information and writing/reading to and from the memory 35. The transmission of the position information involves controlling the wireless transmission device 36, upon detection of a check in the application ID box 22 or confirmation box 26 which functions as an application form 2 transmission enable box, to send the pen ID, application ID and position information to the analyzer 4. The operation of the status indication device 37 refers to processing performed when the digital pen 3 receives unauthorized action information from the analyzer 4, the unauthorized action information being issued by the analyzer 4 when it decides that the user has attempted to write in an inhibited field or that correct information is not entered.

Figure 3:
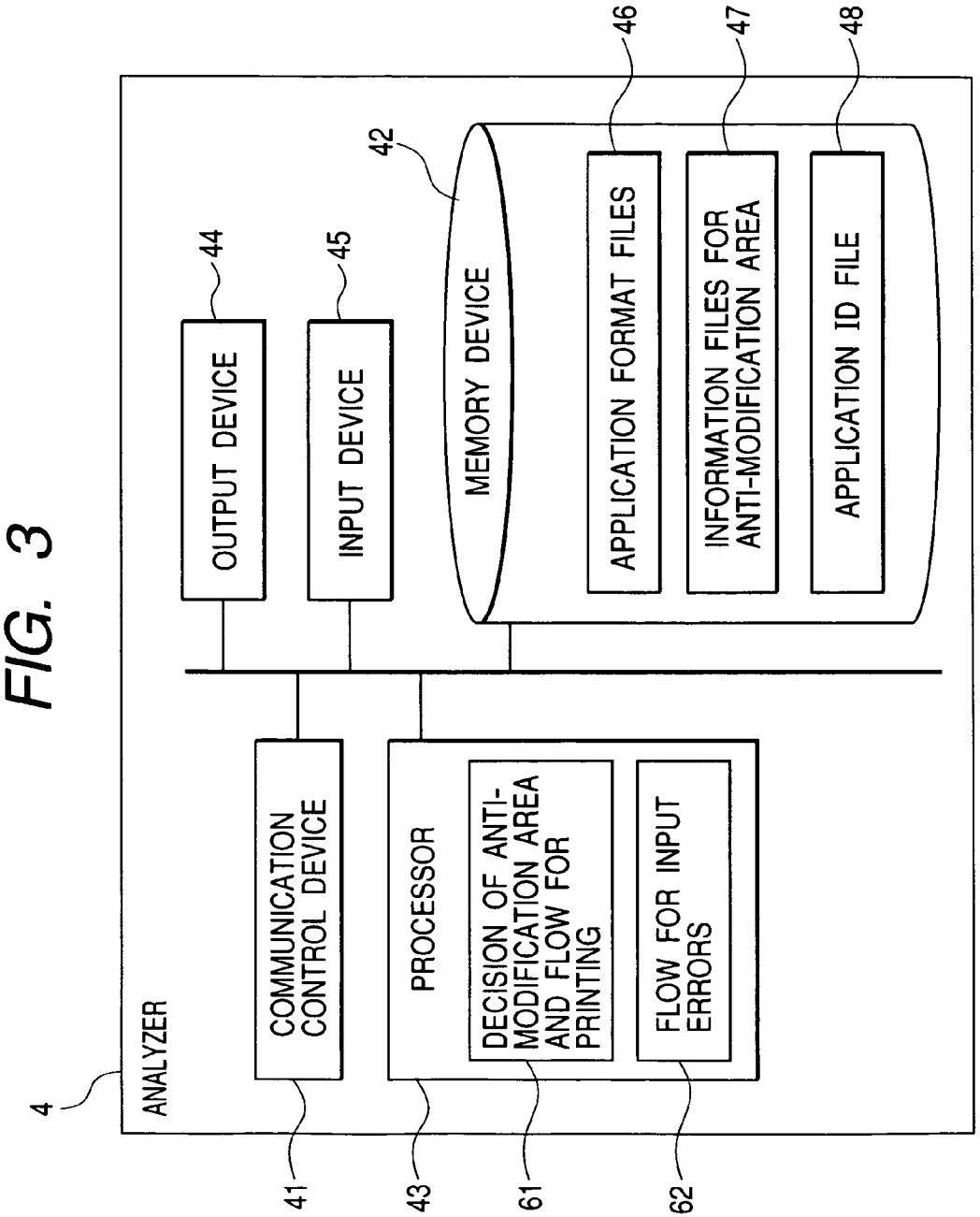
FIG. 3 is a block diagram showing a configuration of an analyzer.

As detailed in FIG. 3, the analyzer 4 comprises at least a communication control device 41 for receiving information from the digital pen 3, a memory device 42 storing an application format file 46, an anti-modification area information file 47 and dot pattern information 48, a processor 43 for processing data, and an output device 44 for printing an additional fine pattern. In addition to this, the analyzer 4 may also include an input device 45 such as a keyboard and a mouse. The communication control device 41, which exchanges data directly with the digital pen 3, may have a relay device installed between it and the digital pen 3 and be connected with the relay device through a wired communication network. In this case, a communication control device that sends and receives data in a protocol compatible with the communication network is used, instead of the communication control device 41 conforming to the aforementioned wireless transmission technology.

The memory device 42 includes a hard disk drive and can store programs to be executed and data to be processed in the processor 43. Information stored in the memory device 42 includes an application format file 46 for associating format information with each application form and an anti-modification area information file 47 storing information about those areas in the format the contents of which one wishes to protect against possible modification. The memory device 42 also stores application ID information 48 that indicates where in the entire dot pattern 27 the dot pattern 21 of each application form shown in FIG. 2 is located.

The application format file 46 of FIG. 3 stores the dot patterns and the sections 22-26 in the application form 2 of FIG. 2 with correspondence between them. This correspondence is defined for each kind of application form.

Figure 4:
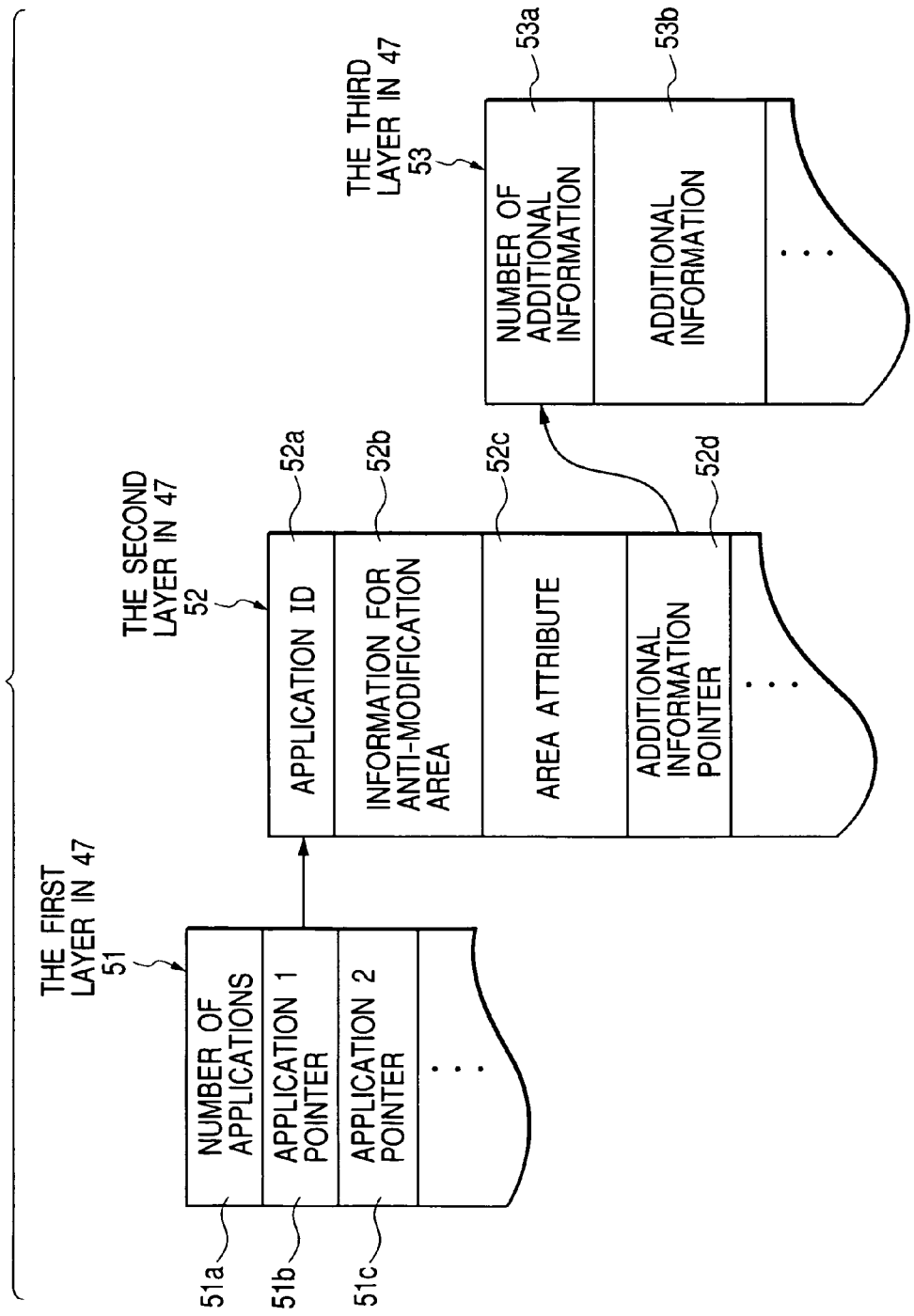
FIG. 4 shows a configuration of an anti-modification area information file.

The anti-modification area information file 47 associates the application form 2 with areas in the format whose contents one wishes to protect against modification. The anti-modification area information file 47 has a layered structure as shown in FIG. 4. A first layer 51 has a total application number 51a representing the number of applications, such as application form 2, handled in the system, and application pointers (application 1 pointer 51b, application 2 pointer 51dc, . . . ) which store start addresses on memory of those data defining the anti-modification areas for each application ID. These application pointers are generated in number equal to the total application number 51*a*.

A second layer 52 starts at an address of the associated application pointer and defines an application ID 52*a*, anti-modification area information 52*b* for that application form, and an area attribute information 52*c*. A range of the anti-modification area 52*b* is generally represented by a collection of rectangular areas. Any other representation may be used as long as it can define the anti-modification areas. This area is printed with an additional fine pattern as required. Another method of representing the anti-modification area involves, for example, registering information about a format of the application form and storing information defining the anti-modification area in the application format file 46. With anti-modification areas defined in this way, desired anti-modification area information can be retrieved by searching through the first layer using the application ID and then searching through the application format file 46 using the format information on the second layer. The area attribute information 52*c* stores attributes such as a kind and a printed color of the fine pattern. Following the area attribute information 52*c* is provided an additional information pointer 52*d* for storing additional information. A third layer 53 has an additional information number 53*a* and an additional information area 53*b*. How they are used will be explained later.

The processor 43 comprises a CPU, a RAM (Random Access Memory) and ROM (Read Only Memory) and performs a general control on processing performed by the analyzer 4. In addition to the functions of receiving the pen point position information and sending data to the associated task applications, the processor 43 also executes functions unique to this embodiment, such as locating anti-modification areas, giving an instruction 61 for printing additional patterns in these areas and executing an input error reception 62. Programs for controlling the processor 43, the output device 44 and task processor 6 in this embodiment for checking anti-modification areas, printing additional patterns in the anti-modification areas (61) and receiving input errors (62) are stored in media such as a memory device 42 and a CD-ROM.

The task processor 6 is a terminal device that executes processing on the application form 2 by means of an associated application program. In other words, the task processor 6 is a known computer having a communication controller, a storage device, a processor and a display. Among tasks performed by the task processor are a work flow using an image generated from image data and a task of handling text data obtained by performing a character recognition operation on image data. A configuration of the task processor and processing performed by it are not detailed here because they are commonly known except that the application form 2 is retrieved and processed as digital data.

Figure 5:
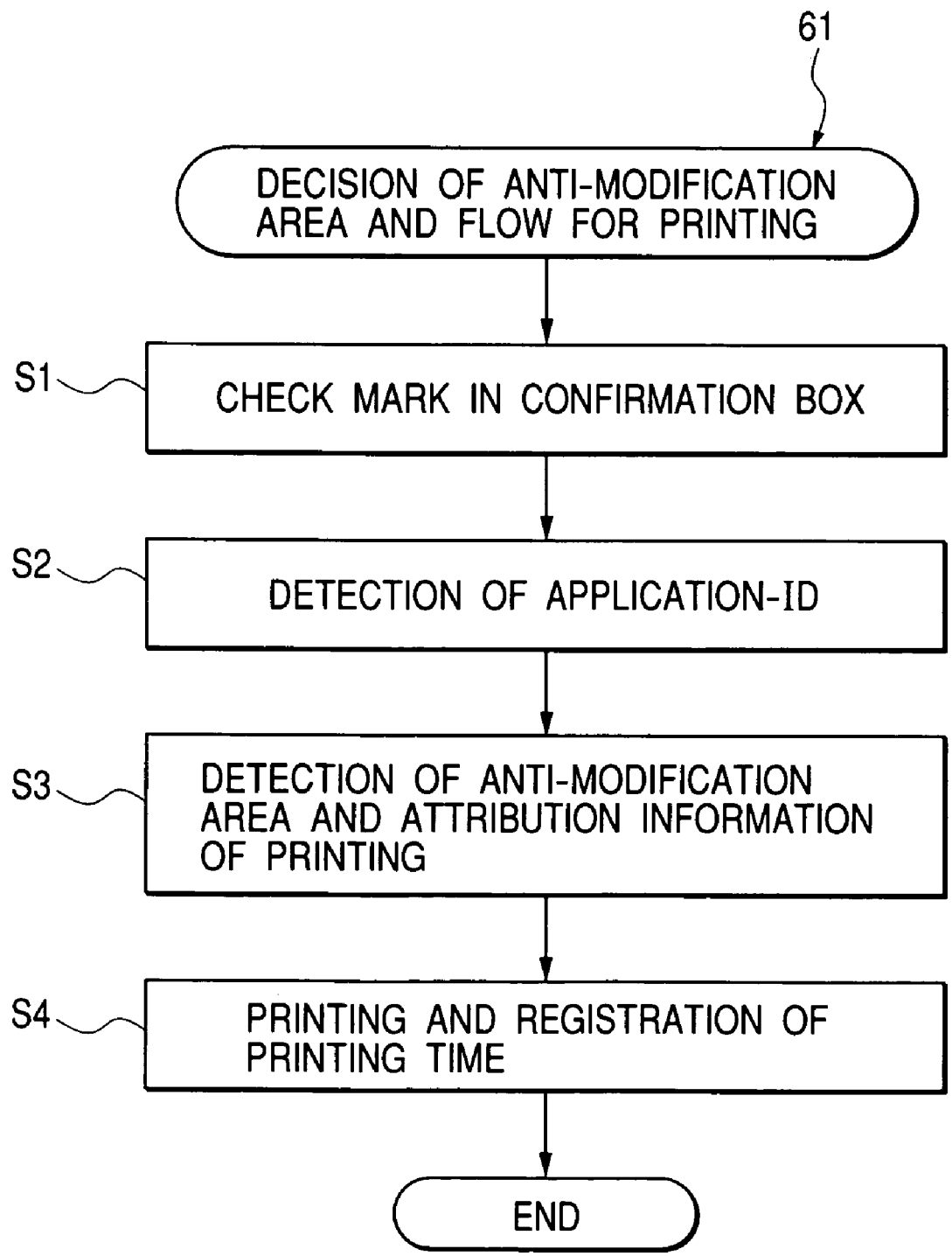
FIG. 5 is a flow chart showing a printing process in the digital pen-based application form filling system with a modification prevention function.
Figure 6:
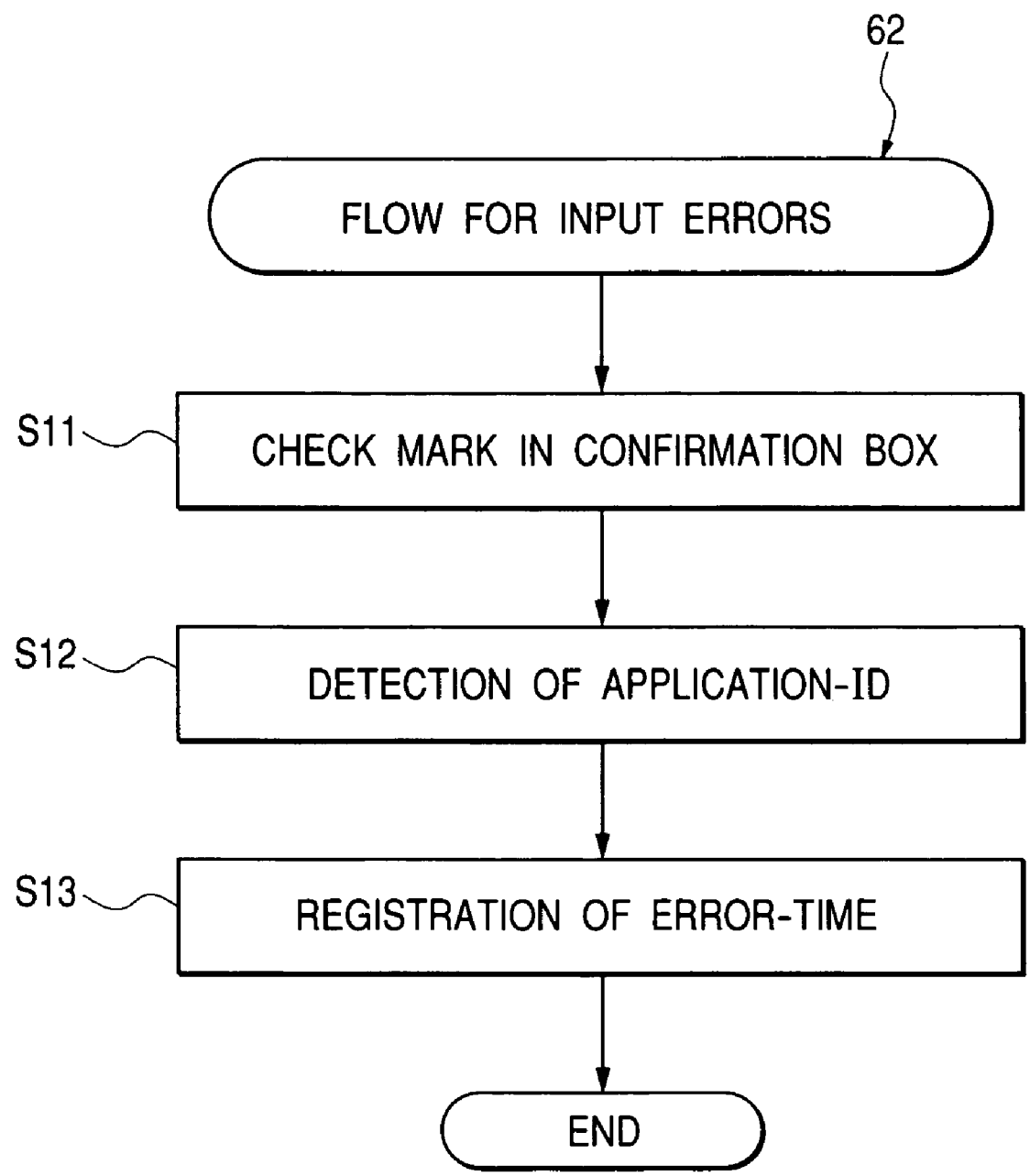
FIG. 6 is a flow chart showing an input error time storing process in the digital pen-based application form filling system with a modification prevention function.

Next, processing performed in the application form filling system 1 using the digital pen 3 will be explained by referring mainly to a flow chart 61 of FIG. 5. In the following example, we will describe how information written into the application form 2 of FIG. 2 using the digital pen 3 is processed. Step S1 checks if the confirmation box 26 of FIG. 2 is given a check mark by means of the digital pen 3. If so, a group of pen point position information stored in the memory 35 of the digital pen 3 is transmitted to the processor 43 through the communication control device 41. Step S2 checks which part of the whole dot pattern 27 the pen point position information group refers to and then determines an application ID based on the application format file 46 and the application ID information 48. Based on the application ID, Step S3 retrieves anti-modification area information for this application form from the anti-modification area information file 47. More specifically, a search is made through the anti-modification area information file 47, whose layer structure is shown in FIG. 4, beginning with the first layer 51, to retrieve from the second layer the information about anti-modification areas and area attributes for the application ID of interest. Step S4 transfers these information to the output device 44 in the analyzer 4. The output device 44 waits for a sheet of the application form 2 to be set and, when it is set, prints with a particular color ink a fine pattern defined by the area attribute information in the corresponding areas in the application form 2. At the same time, the output device 44 stores a print time in a predetermined area in the area attribute information.

In the above example, we have described a case where the printing of fine pattern is triggered by an input of a confirmation check from the digital pen 3. It is also conceivable to add a function of determining an application ID to the output device 44 so that the output device 44 can make a decision for the pattern printing. This requires installing a reading device (such as a camera) in the output device 44 to read a dot pattern in the application ID box 22 or to check if an entry is made at a predetermined position on the application form. When in step 4 of FIG. 5, the processor 43 transfers the anti-modification area information to the output device 44, the application ID is also transferred to the output device 44 and successively accumulated there. When a sheet of application form is set in the output device 44, the output device 44 reads a dot pattern in the application ID box 22 by a reading means to detect the application ID, retrieve the anti-modification area information from the accumulated information, and print a fine pattern in the anti-modification areas. Having the output device make a printing decision allows for a batch operation by which a large volume of application forms, after having been filled in with the digital pen and ready to be processed, can be printed en masse regardless of the timing at which individual application forms were written. Compared with a method which proceeds to the next application form only after the processing on the current application form, ranging from the detection of a check mark in the confirmation box to the printing of a fine pattern, is completed, this method is likely to print on the written application forms in a shorter period of time because there is no need to set the sheets of application form on the output device one by one.

Still another method may also be used which omits the transfer of the anti-modification area information from the processor 43 to the output device 44. With this method, after a sheet is set on it, the output device 44 reads a dot pattern in the application ID box 22 to identity an application ID or application format. Further, by using a reading means, the output device 44 checks that the anti-modification areas in the application format are already filled in with information before proceeding to print a fine pattern on the anti-modification areas. If an application ID is known, a print time is associated with the application ID and then stored. With this method, it is possible to make a printing decision without relying on digital input from the digital pen. A means for identifying an application form in the printing device may include a small chip embedded in the application form for wireless communication and a reader for the small chip provided in the printing device.

Figure 7:
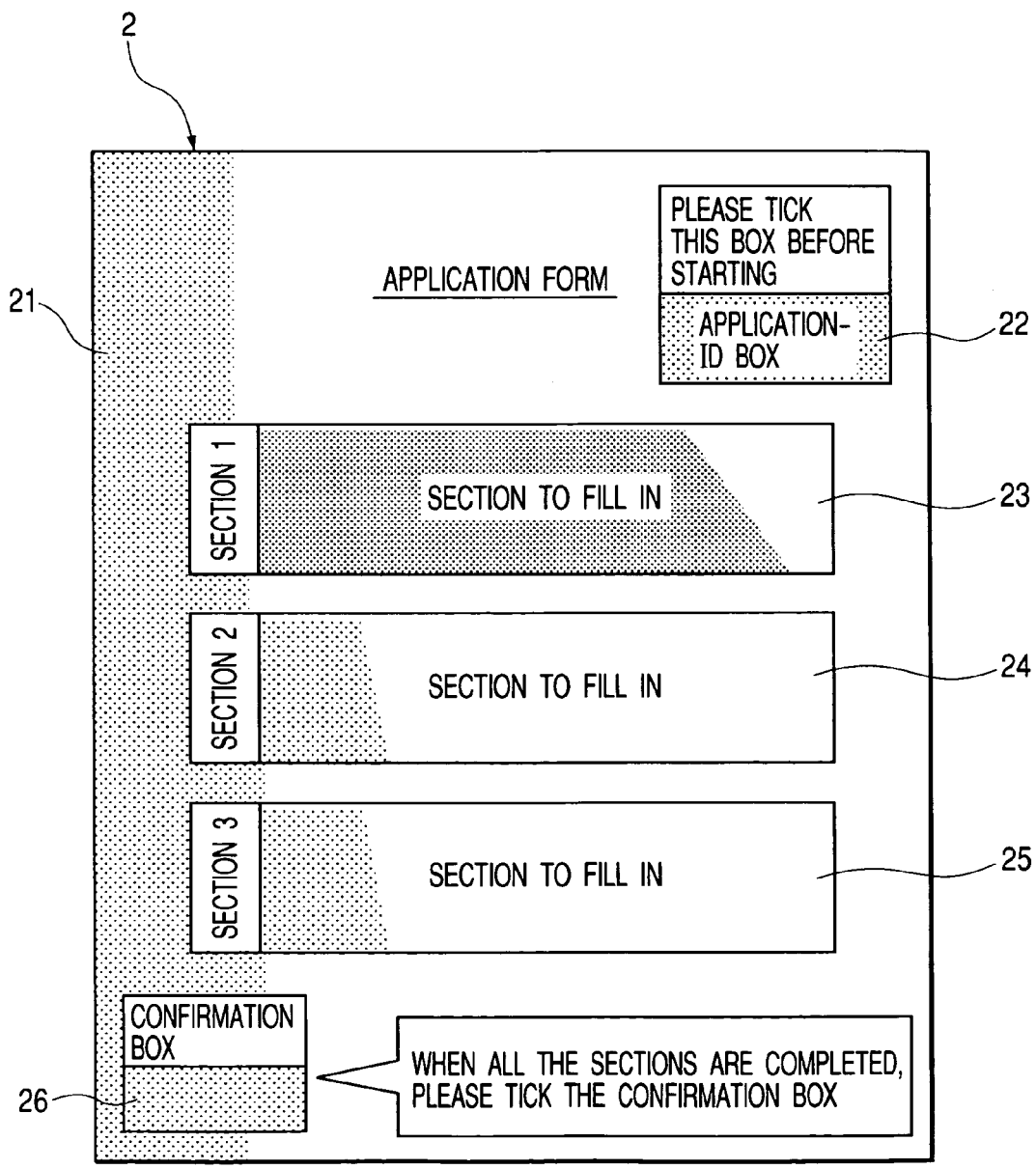
FIG. 7 is an example application form having its anti-modification area printed with a fine pattern.
Figure 8:
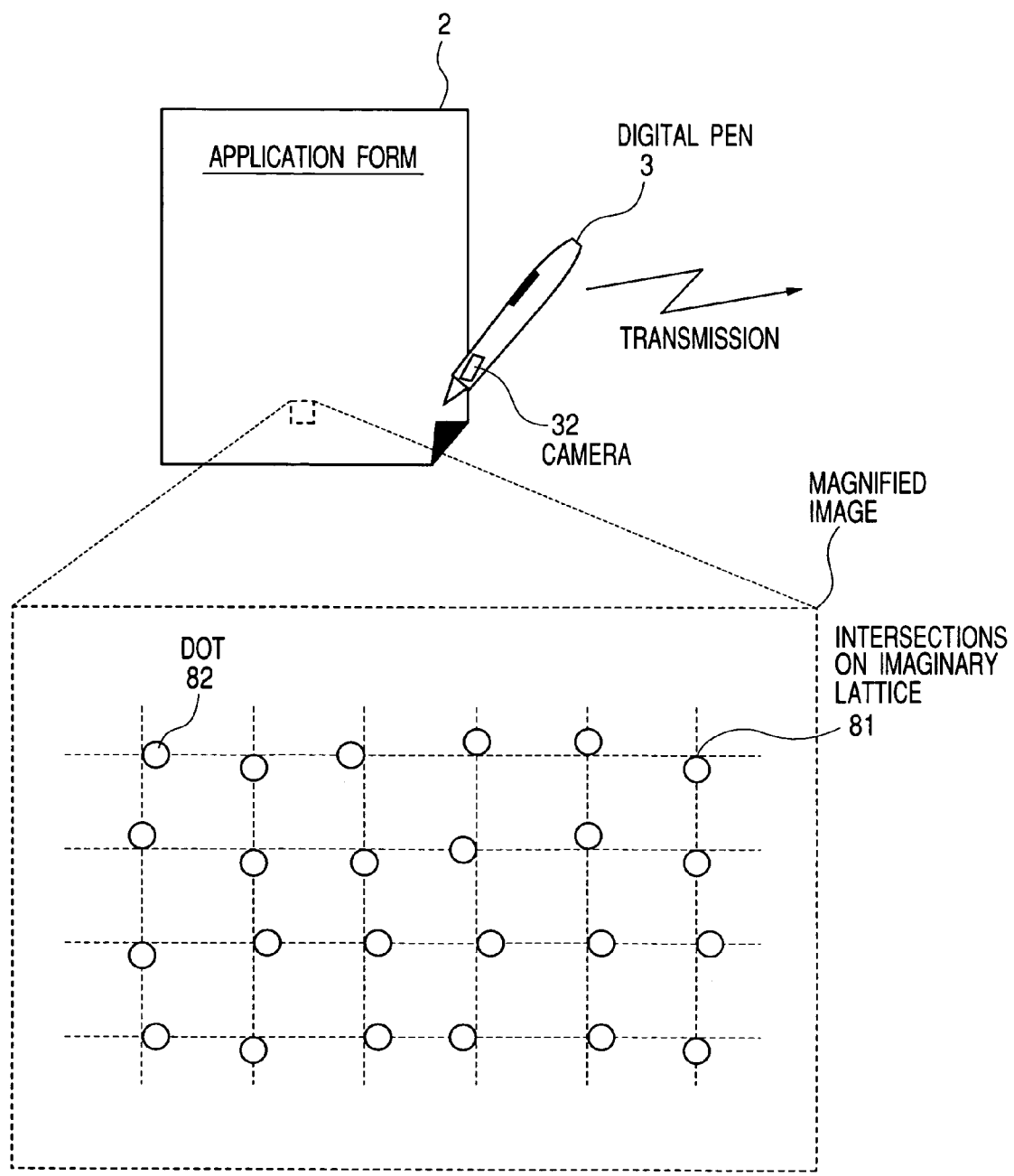
FIG. 8 shows how digital paper works.

FIG. 7 shows an example application form in which the first section 23 is an anti-modification area and printed with a fine pattern. The fine pattern is a pattern that will prevent the camera 32 of the digital pen 3 from identifying the original dot pattern printed on the digital paper. The pattern that nullifies the original dot pattern is, for example, a collection of dots with roughly the same size and density as those of the original dot pattern. Alternatively, the pattern may have a larger dot size and a higher dot density than those of the original dot pattern. It is also possible to paint the anti-modification area with such a color as will not render the information written with the digital pen 3 invisible or unrecognizable to human eye.

The ink with which to print the fine pattern uses a material that can be recognized by the camera 32 of the digital pen 3 as can the original dots. For example, if the original dot pattern is printed with carbon that absorbs infrared light and the camera 32 detects reflected infrared light emitted from the digital pen 3, it is preferred that the fine pattern be printed with an ink that absorbs infrared light. If the camera 32 takes a color image and makes a decision based on an RGB value, it is preferred to use an ink of similar tone. In a system that identifies a dot pattern without using color information, it is preferred that the color of the fine pattern to be printed for modification prevention be made different from that of the original dot pattern (e.g., a black ink may be used to print the original dot pattern and red ink to print the fine pattern for-modification prevention). This arrangement allows the anti-modification area to be visibly identified with human eye so that wasteful attempts to write on the anti-modification area (which would not be reflected on digital information) can be avoided, thus improving the ease of use. Alternatively, in printing the fine pattern, the anti-modification area may be printed with some emphasis, such as printing the area with a thick frame or with a frame of a different color. The fine pattern and its ink color specified in the area attribute information may be defined for each format rather than for each application form, or may be made common to all application forms.

In this flow, it is noted that if anti-modification area information is not registered, step S3 decides that the application form in question has no anti-modification area and therefore step S4 is skipped. If on the other hand anti-modification area information exists, it is assumed that an instruction is displayed on a monitor prompting a user to set the application form in the output device 44. In a final step S5, pen point position information group is transferred to the task processor 6. The task processor 6 processes a work flow that uses a character or drawing image generated from the pen point position information group, or text data generated by performing a character recognition operation on character image data.

If the analyzer 4 receives an input error (ineligible information) from the digital pen 3, e.g., an attempt is made to write on the first section 23 of FIG. 7 and an input error occurs, a time at which the input error took place is stored in the additional information area associated with the application ID in a procedure similar to that of the flow 61, as shown in the flow 62. This ensures that the times of input errors produced when modification was attempted are stored without fail. By comparing these times with the time at which the fine pattern for modification prevention was printed, it is possible to determine whether any modification was attempted.

The number of times and frequency of input errors that occurred following the fine pattern print time are added up for each application form, for each application format, for each field and for each digital pen and then stored in the memory device 42 so that they can be looked up by the task processor 6. If the number of input errors exceeds a preset value, an alarm may be issued from the task processor 6 or digital pen 3 using an alarm sound, a visual alarm or vibrations of a vibrator.

It is noted that the present invention is not limited to the above embodiment but can be used in a wide range of application forms.

For example, in each application form 2, the application ID box 22 may be made to serve also as the confirmation box 26. Rather than being set for each application or for each application format in advance as described above, the printing range of the fine pattern may be set otherwise. For example, digitized application information may be displayed on a monitor to allow a user to select areas on the monitor whose contents he or she wishes to inhibit from any modification and make the selected area a fine pattern printing range. It is also possible to print a fine pattern in a desired area with a handheld printing device. In this case, to record the range where the original dot pattern was nullified requires inputting through a camera incorporated in the digital pen 3 or printing device those points necessary to define a range of the anti-modification area, such as circumference or four corners of the area, and a dot pattern in the application ID box. This arrangement makes it possible to determine and record in which application and in which range the fine pattern was printed.

As described above, even if application forms written with a digital pen which has a possibility of being modified, this invention prints a fine pattern in an anti-modification area after a legitimate entry has been made in that area so that any attempt to change the content in the area using the digital pen results in an input error. This invention therefore can be suitably applied to an application reception system using a digital pen for which a modification prevention is essential.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A digital pen-based application form filling system including a digital pen for writing on an application form, the application form having a dot pattern printed on a surface thereof and entry fields arranged therein, the digital pen having a camera for photographing the dot pattern at and around a pen point to detect a position of the pen point, wherein information hand-written into the entry fields with the digital pen is obtained as position information about loci of the pen point using the dot pattern so that the written information can be handled as digital data; the application form filling system comprising:

a memory device which stores an anti-modification area information file defining anti-modification areas for each application form;

a processor which retrieves from the anti-modification area information file anti-modification area information for the application form based on an application ID, the application ID identifying the application form and being detected by the dot pattern on the application form; and a printing unit which prints a pattern for nullifying the dot pattern used to detect a position of the pen, in the anti-modification areas in the application form according to the anti-modification area information for the application form.

2. A digital pen-based application form filling system according to claim 1, wherein the processor receives from the digital pen information entered in a field in the application form provided to detect an application ID, and determines the application ID from the information entered.

3. A digital pen-based application form filling system according to claim 1, wherein the printing unit notifies to the processor a time at which the nullifying pattern was printed, associates the print time with the application form printed with the nullifying pattern, and stores them in the anti-modification area information file.

4. A digital pen-based application form filling system according to claim 3, wherein, based on an input error notified from the digital pen after the nullifying pattern was printed by the printing unit, the processor stores a time at which the input error took place.

5. A digital pen-based application form filling system according to claim 1, wherein
the memory device stores an attribute information file including attribute information associated with the application form, the attribute information including a kind of print pattern and a print color to be used in printing the nullifying pattern,
the processor searches through the memory device for attribute information associated with the application form according to the application ID, the attribute information being used in printing the nullifying pattern, and
the printing unit prints the nullifying pattern based on the retrieved attribute information.

6. A digital pen-based application form filling system according to claim 1, wherein the printing unit prints the nullifying pattern in a color different from that of the dot pattern.

7. A digital pen-based application form filling system according to claim 1, wherein the printing unit prints the nullifying pattern by emphasizing an area being printed.

8. A modification prevention method in an application form filling system, wherein the application form filling system includes a digital pen for writing on an application form, the application form having a dot pattern printed on a surface thereof and entry fields arranged therein, the digital pen having a camera for photographing the dot pattern at and around a pen point to detect a position of the pen point,
wherein information hand-written into the entry fields with the digital pen is obtained as position information about loci of the pen point using the dot pattern so that the written information can be handled as digital data; and
a nullifying pattern that nullifies the dot pattern used to detect a position of the pen is printed in anti-modification areas occupying at least a part of the application form.

9. A modification prevention method according to claim 8, further including the steps of:
preparing a memory device storing anti-modification area information, the anti-modification area information associating the anti-modification areas with the application form;
detecting an application ID identifying the application form by using the dot pattern of the application form, and
searching through the anti-modification area information based on the application ID to determine the anti-modification areas in the application form.

10. A modification prevention method according to claim 9, wherein the application ID is detected by writing with the digital pen on a field printed with a dot pattern, the field provided in the application form for detection of the application ID.

11. A modification prevention method according to claim 9, wherein a time at which the nullifying pattern was printed on the application is detected, and the print time is associated with the application ID of the application form and stored.

12. A modification prevention method according to claim 11, wherein, when an input error is notified from the digital pen after the nullifying pattern is printed, an input error time is associated with the application ID and stored.

13. A modification prevention method according to claim 9, wherein attribute information including a print pattern kind and a print color to be used in printing the nullifying pattern is associated with the application ID and stored in the memory device, and
the nullifying pattern is printed by referring to the attribute information according to the application ID.

14. A modification prevention method according to claim 8, wherein the nullifying pattern is printed in a color different from that of the dot pattern.

15. A modification prevention method according to claim 8, wherein the nullifying pattern is printed by emphasizing an area being printed.

16. A modification prevention program for an application form filling system,
wherein the application form filling system has a memory device for storing an anti-modification area information file containing anti-modification area information for each application form, a processor and a printing unit, wherein application form filling system also includes a digital pen for writing on an application form, the application form having a dot pattern printed on a surface thereof and entry fields arranged therein, the digital pen having a camera for photographing the dot pattern at and around a pen point to detect a position of the pen point, wherein information hand-written into the entry fields with the digital pen is obtained as position information about loci of the pen point using the dot pattern so that the written information can be handled as digital data;
the modification prevention program including the codes for executing:
a first step of searching anti-modification area information associated with the application by means of the processor according to an application LID identifying the application form, the application ID being detected by the dot pattern of the application form; and
a second step of printing a nullifying pattern, that nullifies the dot pattern used to detect a position of the pen, in anti-modification areas identified by the retrieved anti-modification area information for the application form by means of the printing unit.

17. A modification prevention program according to claim 16, wherein the first step has a third step to detect the application LID by writing with the digital pen on a field printed with a dot pattern, the field provided in the application form for detection of the application ID.

18. A modification prevention program according to claim 16, wherein the second step includes a fourth step to associate a time at which the nullifying pattern was printed with the application ID and record them.

19. A modification prevention program according to claim 18, further including the codes for executing a fifth step which, when after the nullifying pattern print time an input error is notified from the digital pen, associates an input error time with the application ID and stores them.

20. A modification prevention program according to claim 16, wherein the memory device stores attribute information linking with the application ID, the attribute information including a print pattern kind and a print color to be used in printing the nullifying pattern, the first step searches attribute information associated with the application ID, and the second step prints the nullifying pattern according to the retrieved attribute information.

* * * * *